April 15, 1930.  B. R. WRIGHT  1,754,588
IDENTIFICATION PLATE
Filed Jan. 17, 1927
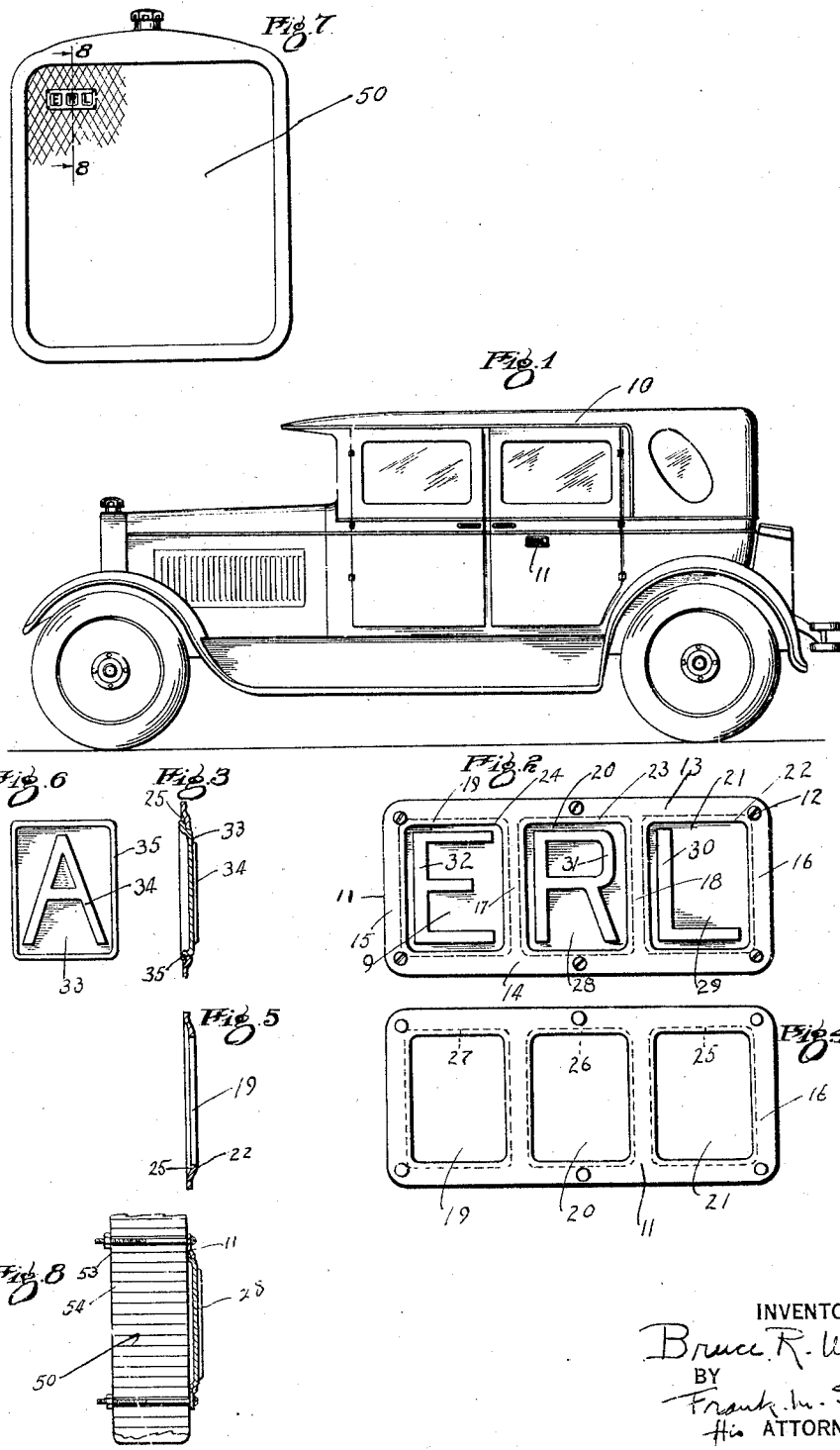
INVENTOR
Bruce R. Wright
BY
Frank M. Slough
His ATTORNEY.

Patented Apr. 15, 1930

1,754,588

UNITED STATES PATENT OFFICE

BRUCE R. WRIGHT, OF WINDSOR, VERMONT

IDENTIFICATION PLATE

Application filed January 17, 1927. Serial No. 161,518.

My invention relates to an improved identification plate and more particularly it relates to an owner's detachable initial plate for automobiles, trunks and the like.

One of the objects of my invention is to provide an identification plate which may be applied to an article without permanently injuring the same and which may be detachable therefrom without disfiguring the article.

Another object of my invention resides in the provision of an identification plate for automobiles which may be visible at all times and which may be detached therefrom when the owner wishes to dispose of the automobile.

Another object of my invention resides in the provision of an identification plate for automobiles which may be placed on the automobile when originally sold or which may be applied to the same as a permanent or temporary accessory and wherein the initial plates are interchangeable.

Another object of my invention resides in the provision of an initial shield which is pleasing to the esthetic sense, simple and durable in construction and economical to manufacture in large quantities.

These and other objects of my invention and the invention itself will become apparent from reference to the following description of certain embodiments thereof and in which embodiments reference is had to the accompanying drawings forming a part of this specification.

Fig. 1 shows a side elevational view of an automobile embodying my invention;

Fig. 2 shows an elevational view of an embodiment of my invention, detached from the automobile and of actual size;

Fig. 3 shows a sectional view thereof;

Fig. 4 shows an elevational view of one of the frames;

Fig. 5 shows a sectional view thereof;

Fig. 6 shows an elevational view of one of the characters;

Fig. 7 shows a front elevational view of an automobile radiator embodying my invention;

Fig. 8 shows a sectional view of the same.

For purposes of illustration, I have shown my invention applied to an automobile, however, it is to be understood that I sometimes contemplate applying the same to trunks and therefore do not wish to limit myself to the specific embodiments herein illustrated and described.

It is a practice for automobile owners to apply their initials to their automobiles by painting the same thereon or applying with decalcomania on the body thereof. Obviously more owners would apply their initials to cars were it not for the fact of the handicap arising when desiring to dispose of his car, resulting from disfiguring the automobile body to remove the initials. My invention aims to overcome this objection by applying the owner's initials in a manner whereby they may be interchangeable and/or detachable without disfiguring the automobile body.

Referring to Figs. 1 and 2 of the drawings wherein like reference characters designate like parts, at 10 I show an automobile body and at 11 a skeleton frame secured to the body by screws 12. Said frame preferably comprises longitudinal side portions 13 and 14, transverse end portions 15 and 16, and a pair of intermediate transverse ribs 17 and 18 adapted to provide spaced openings 19, 20 and 21 in the frame 11, each opening being of uniform size. Flanges 22, 23, and 24 extend around the inner sides of the openings and are provided with grooves 25, 26 and 27 formed in the edges of the openings.

At 9, 28 and 29, I show metallic interchangeable plates having identifying characters 30, 31 and 32 formed integral on an outer surface 33 of a central raised portion 34 thereof and adapted to project through the openings 19, 20 and 21. The depressed edge portion 35 of the plates are disposed in the grooves 25, 26 and 27 and are clamped between the automobile and the flanges 22, 23 and 24 when the frame is applied to the automobile body 10 and secured thereon by the screws.

Referring to Figs. 7 and 8 of the drawings wherein I show my improved identification plate heretofore described, applied to a radiator 50 of an automobile and retained thereon by virtue of elongated bolts 51 projected between the fins 53 and tubes 54 of the radiator and the frame, each bolt receiving a nut threaded onto the ends thereof and engaging the inner surface of the radiator.

The frames and plates I preferably form of a metallic material, by casting the same. Such a metal I have found satisfactory being a nickle plated brass; bronze or aluminum; or any metals possessing anti-rust qualities and capable of taking a polish. A plate constructed in the manner described in the foregoing will add a pleasing appearance to the side of the automobile body to which it may be attached.

If the owner of an automobile provided with an identification plate on the body thereof comprising his initial wishes to remove the initial plates which are interchangeable he may do so and the purchaser of the car may purchase his own intials and place them in the frame, so that the body of the car is not marked or destroyed by removal of the plate.

In the case of the application of my invention to the radiator of an automobile it is obvious that the same may be removed therefrom without injuring the appearance of the car.

Having thus described my invention in certain specific embodiments I am aware that numerous and extensive departures may be made from the embodiments herein illustrated and described but without departing from the spirit and scope of my invention.

I claim:

1. In a device of the class described, the combination with a plurality of dished character plates each having laterally extending rim flanges, of a common dished frame for the plates, said frame having an outwardly extending rim flange and having a plurality of aligned apertures into each of which one of said character plates may be interchangeably projected with its flange in retaining engagement with the inner surface of the common frame, and with the back of said first mentioned flanges in engagement with a fixed support, and with the character supporting surface of the plates projected through the apertures from the rear thereof and means adapted to secure the frame to said support by its rim flange.

2. In a device of the class described, the combination with a plurality of dished character plates each having laterally extending rim flange means, of a common dished frame for the plates, said frame having an outwardly extending rim and having a plurality of apertures, into each of which one of said character plates may be interchangeably projected with its rim flange means disposed intermediate the inner surface of the common frame and a fixed support to which said frame is secured, and with the character supporting surface of the plates projected through the apertures from the rear thereof, and means adapted to secure the frame to said support by its rim.

In testimony whereof I hereunto affix my signature this eighteenth day of December, 1926.

BRUCE R. WRIGHT.